(12) United States Patent
Könnölä et al.

(10) Patent No.: US 9,135,341 B2
(45) Date of Patent: Sep. 15, 2015

(54) METHOD AND ARRANGEMENT FOR PAGINATING AND PREVIEWING XHTML/HTML FORMATTED INFORMATION CONTENT

(75) Inventors: Mika Könnölä, Espoo (FI); Rami Hänninen, Espoo (FI); Pasi Nummisalo, Vantaa (FI); Terho Laakso, Espoo (FI)

(73) Assignee: DOCUMILL OY, Espoo (FI)

( * ) Notice: Subject to any disclaimer, the term of this patent is extended or adjusted under 35 U.S.C. 154(b) by 1282 days.

(21) Appl. No.: 12/269,741

(22) Filed: Nov. 12, 2008

(65) Prior Publication Data
US 2009/0150769 A1 Jun. 11, 2009

(30) Foreign Application Priority Data

Dec. 11, 2007 (FI) ...................................... 20075897

(51) Int. Cl.
| | | |
|---|---|---|
| G06F 17/00 | (2006.01) | |
| G06F 17/20 | (2006.01) | |
| G06F 17/21 | (2006.01) | |
| G06F 17/22 | (2006.01) | |
| G06F 17/24 | (2006.01) | |
| G06F 17/25 | (2006.01) | |
| G06F 17/26 | (2006.01) | |
| G06F 17/27 | (2006.01) | |
| G06F 17/28 | (2006.01) | |
| G06F 17/30 | (2006.01) | |

(52) U.S. Cl.
CPC ................................ G06F 17/30864 (2013.01)

(58) Field of Classification Search
CPC . G06F 17/24; G06F 17/211; G06F 17/30864; G06F 17/30389; G06F 17/217; G06F 17/2247; G06F 17/30696

USPC ................... 715/256, 251, 738; 707/999.005, 707/E17.014, 999.055
See application file for complete search history.

(56) References Cited

U.S. PATENT DOCUMENTS

| | | | | |
|---|---|---|---|---|
| 6,819,339 | B1 * | 11/2004 | Dowling ........................ | 715/738 |
| 7,069,506 | B2 * | 6/2006 | Rosenholtz et al. .......... | 715/273 |
| 7,162,493 | B2 * | 1/2007 | Weiss et al. ............. | 707/999.01 |
| 7,383,510 | B2 * | 6/2008 | Pry ............................... | 715/745 |
| 7,509,585 | B1 | 3/2009 | Gauthier et al. | |
| RE42,413 | E * | 5/2011 | Snyder ......................... | 707/802 |
| 2002/0129051 | A1 * | 9/2002 | Abdelhadi et al. .......... | 707/501.1 |
| 2004/0148571 | A1 * | 7/2004 | Lue ............................... | 715/514 |
| 2004/0267700 | A1 * | 12/2004 | Dumais et al. ................... | 707/2 |
| 2005/0091585 | A1 * | 4/2005 | Parikh et al. ................... | 715/517 |
| 2006/0277167 | A1 * | 12/2006 | Gross et al. ...................... | 707/3 |
| 2006/0294476 | A1 * | 12/2006 | Buckley ........................ | 715/781 |
| 2007/0073833 | A1 * | 3/2007 | Roy et al. ...................... | 709/217 |
| 2008/0172374 | A1 * | 7/2008 | Wolosin et al. .................. | 707/5 |
| 2008/0282179 | A1 * | 11/2008 | Kim et al. ..................... | 715/769 |
| 2010/0095239 | A1 * | 4/2010 | McCommons et al. ...... | 715/784 |

* cited by examiner

Primary Examiner — Manglesh M Patel
Assistant Examiner — Nicholas Hasty
(74) Attorney, Agent, or Firm — Birch, Stewart, Kolasch & Birch, LLP

(57) ABSTRACT

The invention relates to a method and an arrangement for paginating and previewing essentially continuously-flowing non-paginated search results, such as XHTML/HTML formatted information content. The method includes at least: entering a search query; sending the query to a search engine; and receiving a search result having a list of data files matching to the search query. The method comprises at least: paginating the essentially continuously-flowing content of the data files retrieved; rendering preview pages from the data files; selecting the preview pages to be previewed; and previewing the matching preview pages associated with the data files retrieved.

24 Claims, 12 Drawing Sheets

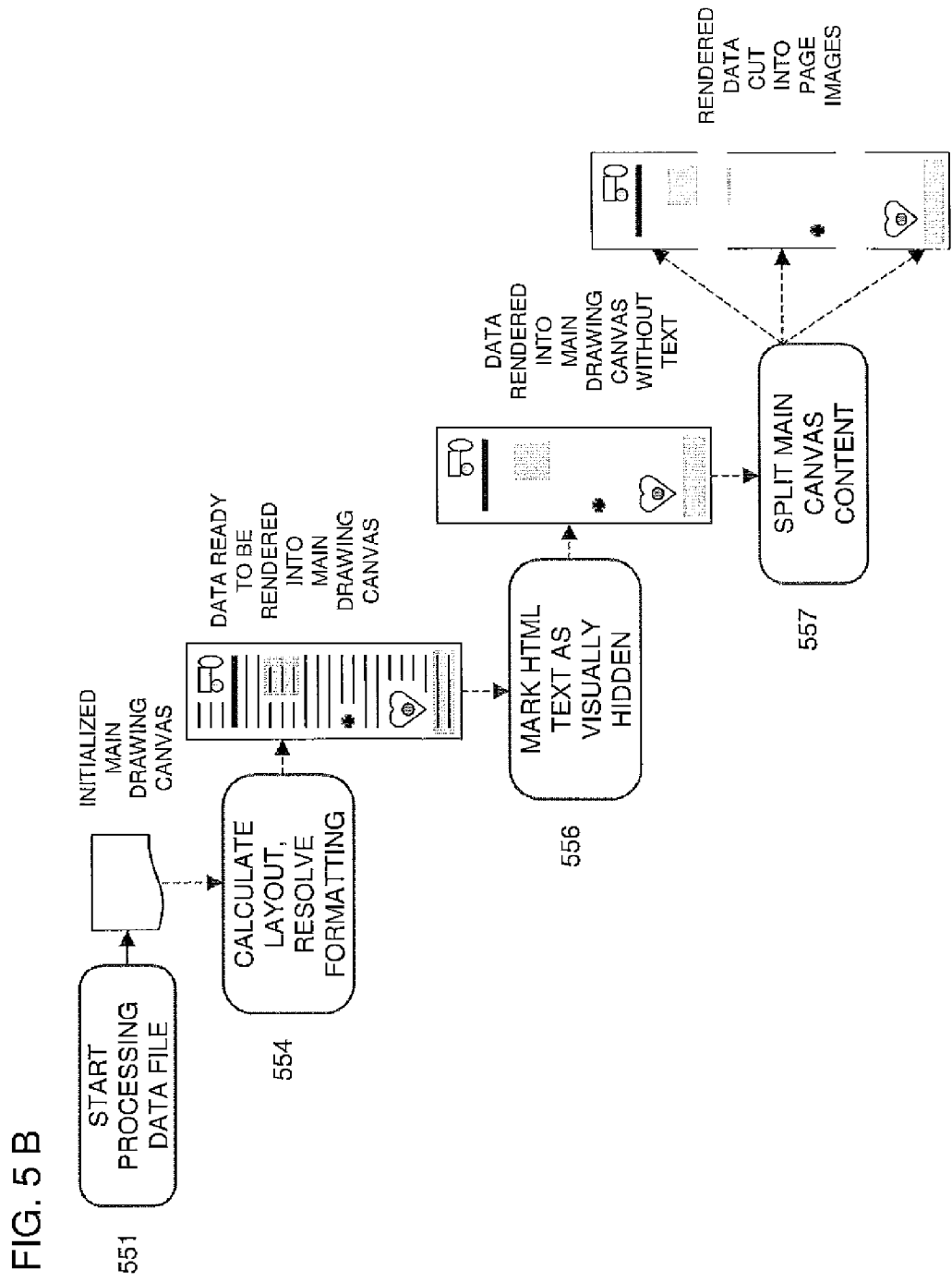

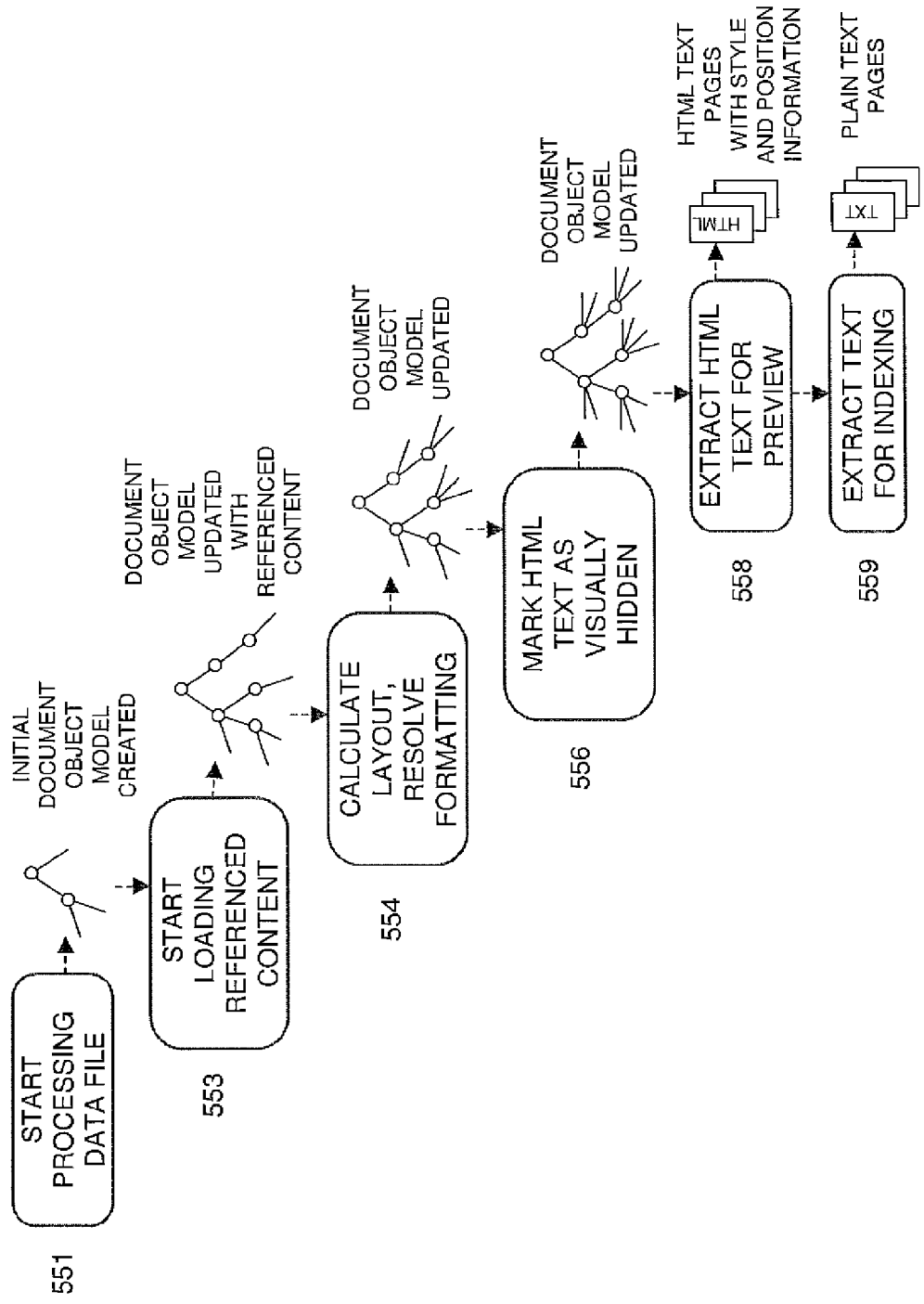

METHOD AND ARRANGEMENT FOR PAGINATING AND PREVIEWING XHTML/HTML FORMATTED INFORMATION CONTENT

FIELD OF THE INVENTION

This invention relates to the field of information search and content previewing. In particular, the present invention relates to a method according to claim 1 and an arrangement according to claim 13 to preview search results obtained from search engine in response to a user query that can be generated automatically or manually.

BACKGROUND OF THE INVENTION

The continued growth and popularity of the Internet and company Intranets and Extranets as sources of information has resulted to information explosion to users. This has lead to a demand from users to visually verify search result relevancy thru previewing prior having to download the actual content. This preview functionality is expected to be an integrated part of the overall information search experience. Typically, when a human user is looking for information from Internet on a particular subject he or she will use public search engines such as Google or Yahoo Search.

Generally speaking a search engine is a program that performs a search based on user search query (e.g. keyword(s) or phrase) and sends the search results back to the user. Typically, these result lists include a listing of hyperlinks for the web pages or other documents produced by the search and additional information such as an excerpt of the text on the page, which relates to the keywords entered by the user for the search and the file type of the result document. Techniques, such as Boolean query language, may be used to create a search phrase and limit and narrow down the number of search hits.

In case of a typical Internet, Intranet or Extranet content such as Extensible HyperText Markup Language (XHTML) and HyperText Markup Language (HTML) files, search results may include cached version of the content stored and managed by the search engine as it was at the time the search engine carried out content crawling and indexing activity. Cached version of the content may be a full copy of the original content or a striped-down version of it. Later in the context of explaining this invention, the concept of "data file" is used to describe various forms of HTML and XHTML formatted data streams, which may be stored in static files, or dynamically generated as a response to query delivered by appropriate communication protocol such as HyperText Transfer Protocol (HTTP).

Often, search engines cache textual content only, leaving out graphics and other multimedia components. In some cases the cached content contains links to the multimedia objects, and if such linked data is still available online, viewing cached version means relying on old version of the content bundled with currently available graphics. If associated multimedia objects have changed since indexing, or are not available at all, this approach may significantly degrade the visual aspects of the content layout and its look-and-feel. This method does not serve well the users' need for fast information access into long XHTML/HTML files, nor the demand for the instant discovery of those parts of the content which contain matching search criteria.

In order to find a matching part of the long XHTML/HTML content file, the user has to manually scroll and read thru the content until he or she finds the possibly highlighted search term, or alternatively carry out secondary search using the embedded content search functionality within a Web browser. The process requires additional effort from the user and is cumbersome for long content files such as news, blogs or articles in Internet as well as corporate Extranets and Intranets.

In some cases the search listing contains visual presentations (also known as thumbnails) of the web pages, still images or first/multiple frames of the video content. In case of the Web document thumbnails, the rectangular upper part of XHTML/HTML page is rendered as bitmap and resized in order to create a visual abstract of the upper part of the page. It is well known to those skilled in the art that rendering means processing a document for visual representation. The rendering engine of the web browser essentially processes format instructions and converts them into graphical elements, determines the layout and calculates the overall appearance of the document.

The above described thumbnail presentation may perform acceptably with those web documents where the content length is sufficiently short, allowing all of the content in the source XHTML/HTML page to be conveniently rendered into a standard screen size, aspect ratio and resolution available for thumbnail viewing. After the content is rendered into the intended viewing size using a virtual canvas, it is often scaled down according to specified thumbnail dimensions, providing a high-level preview of the web page.

The thumbnail dimensions vary among different services, but as the goal is to provide a visual preview of the upper part of the web page while leaving room for some concurrently visible content on that page, the width of the thumbnail is often less than half of the intended rendered size. These small dimensions combined with a high compression factor of the bitmap image make it difficult to read small text rendered into the thumbnail—only large high-level details are visible and distinguishable.

While the above described method works fine for short XHTML/HTML content, there are significant shortcomings when content files are long, spanning into multiple pages when printed out. The length of these files such as blogs is expected to grow as new textual content is often appended at the end of the file. This is a typical situation with news feed services, discussion groups, and blogs—all of them experiencing a significant growth in usage volumes both in Internet as well as corporate Extranets and Intranets.

When these long XHTML/HTML contents are paginated for example to print them, it is quite common that one single XHTML/HTML page spans into tens of separate pages. In such cases it is evident that just providing the rectangular upper part of the XHTML/HTML page is not sufficient. The searchable keyword may be located outside the preview area. In case of providing previews with search term highlighting or other context-sensitive enhancements, such partial previews may completely miss the relevant content the search was originally targetted at. For the end-user, this kind of partial content presentation causes several usability issues when previews are used to enhance search results.

One of the typical ways to share search findings in Internet and Intranet environments is to send a bookmark to other users. This allows other users to directly open the document which has been reviewed by some other user to contain relevant and interesting data. These bookmarks are often links to the document file instead of accurate pointers of interesting sections of the document. The document level link accuracy causes a lot of additional effort for long XHTML/HTML documents when the content is previewed and screened by other users. To locate the relevant part of the long document, other users need to either scroll and browse thru the document to find relevant keywords, or find appropriate position with secondary, browser-based string-search functionality.

In case of paginating and previewing long XHTML/HTML documents visual accuracy and capability to re-produce the original layout characteristics is one of the key features needed to be able to provide good user experience. Typically the original XHTML/HTML content does not contain pagination information such as page breaks, the preview generation process should be able to define and enforce such pagination logic which makes it possible for dividing long XHTML/HTML content pieces into logical, readable slices emulating typical per page printing behavior. However, as XHTML/HTML content may have specific style definitions for printing purposes, emulating printer behavior only is not sufficient. The system should be able to accurately reproduce the visual aspects of the XHTML/HTML content just as it would be viewed thru a browser.

The system should also be able to uniquely identify and mark these paginated preview pages for page-level bookmarking and content sharing purposes. Enabling direct access into an area of XHTML/HTML content containing search keywords or other unique identifiers improves accessibility and discoverability of information content.

SUMMARY OF THE INVENTION

In view of the foregoing and other problems of the conventional information search and previewing methods, it is, therefore, an object of the present invention to provide a method and arrangement for handling of information search results in a way that helps to reduce time spent on accessing and previewing content formatted as extensible HyperText Markup Language (XHTML) and/or HyperText Markup Language (HTML). In general the method of the invention is characterized by what is disclosed in claim 1. Correspondingly, the arrangement of the invention is characterized by what is disclosed in claim 13. Other embodiments of the invention are characterized by what is disclosed in the other claims.

According to one aspect of the present invention there is a client-server computing platform including; (a) means for examination of the data file name returned by a search engine, (b) means for identification of the source (URL) from which the data files are available, (c) means for obtaining the data files from the source and (d) means for generating one or more uniquely identifiable visual preview pages of the data files.

According to another aspect of the present invention a standard web browser is sufficient for accessing and previewing generated visual preview pages of the data files formatted as layered XHTML/HTML content. It is also possible to enable access and preview capabilities for other system-supported visual preview page formats such as vector-based data like Scalable Vector Graphics (SVG), Adobe Flash, Adobe PDF and Microsoft Silverlight by web browser plug-ins or other optional extensions.

According to further features of the invention the data files described in the previous paragraphs contain continuously-flowing non-paginated XHTML/HTML formatted content. The invention has means for generating visual preview pages of data files that may differ in visual dimensions (pixels) but the representations will always follow the pagination logic defined by the system and calculated as part of the content rendering process of the data file content. The rendering process creates individual preview pages of the data file content according to the system-defined pagination.

The preview pages of a data file may be presented as an m by n matrix area below the individual search result provided by the search engine. A larger and readable presentation of the preview page may be displayed on the output device when the cursor or pointer is moved or clicked on top of the small preview page. The larger preview page may also be closed when the cursor or pointer is clicked or moved away from the large preview page displayed on the output device.

Other objects, advantages and important features of the present invention will become apparent from the following detailed description taken in conjunction with the annexed drawings, which disclose but do not limit preferred embodiments of the invention.

BRIEF DESCRIPTION OF THE DRAWINGS

The accompanying drawings, which are incorporated in, illustrate an embodiment of the present invention. It should be understood, however, that the invention is not limited to precise arrangements and depictions shown in the drawings.

FIG. 2A illustrates main modules of the preview engine;

FIG. 5B is a diagram of exemplary visual preview page image component generation process according to an implementation consistent with the principles of the invention;

FIG. 5C is a diagram of exemplary visual preview page textual component generation process according to an implementation consistent with the principles of the invention;

DESCRIPTION OF THE INVENTION

The following detailed description of the invention refers to the accompanying drawings. The same reference numbers in different drawings identifies the same or similar elements. Also, the following detailed description does not limit the invention.

The present invention aims to improve and quicken the user's ability to discover and preview relevant information in a content formatted as either extensible HyperText Markup Language (XHTML) or HyperText Markup Language (HTML). This may be accomplished by creating and possibly caching artificially paginated visual presentations of the content for quick previewing. In that respect the invention is a tool that makes the discovering and previewing of information and particularly discovering and previewing of search results easier and faster compared to conventional solutions.

The arrangement according to the present invention enhances information discovery and dissemination by displaying differently sized visual presentations of artificially paginated data files. This provides the user with ability to quickly review and verify the relevancy of the data file content. The user can concurrently work with several data files' contents because the arrangement provides simultaneously previews from several data files to the output device.

In one embodiment, the server uses a caching mechanism to store the visual presentations and folder structures with related meta-data of the data files into a cache so that users who later access the same document do not require the system to regenerate the visual presentations. The cache may be programmed to store the visual presentations and folder structures with related meta-data for a specific amount of time and then delete the presentations to conserve storage space. The cache may also be programmed to optimize the visual presentations in means of bitmap graphics optimization and a graphics format compression to conserve storage space or converting visual presentation into different scalable graphics formats such as SVG. The cache may also contain meta-data for tagging and bookmarking visual presentations.

Figure 1:
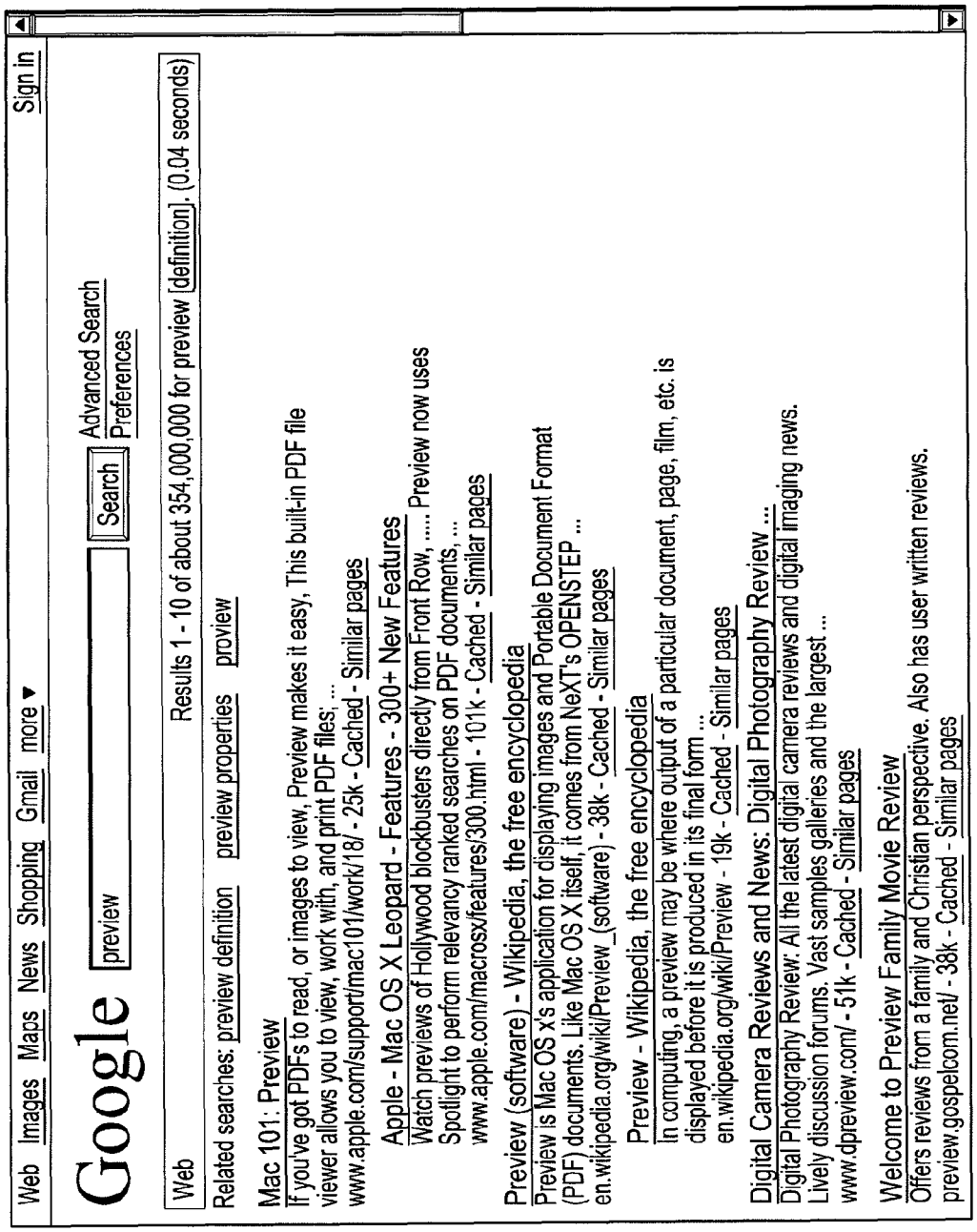
FIG. 1 illustrates a prior art search results listing.
Figure 2:
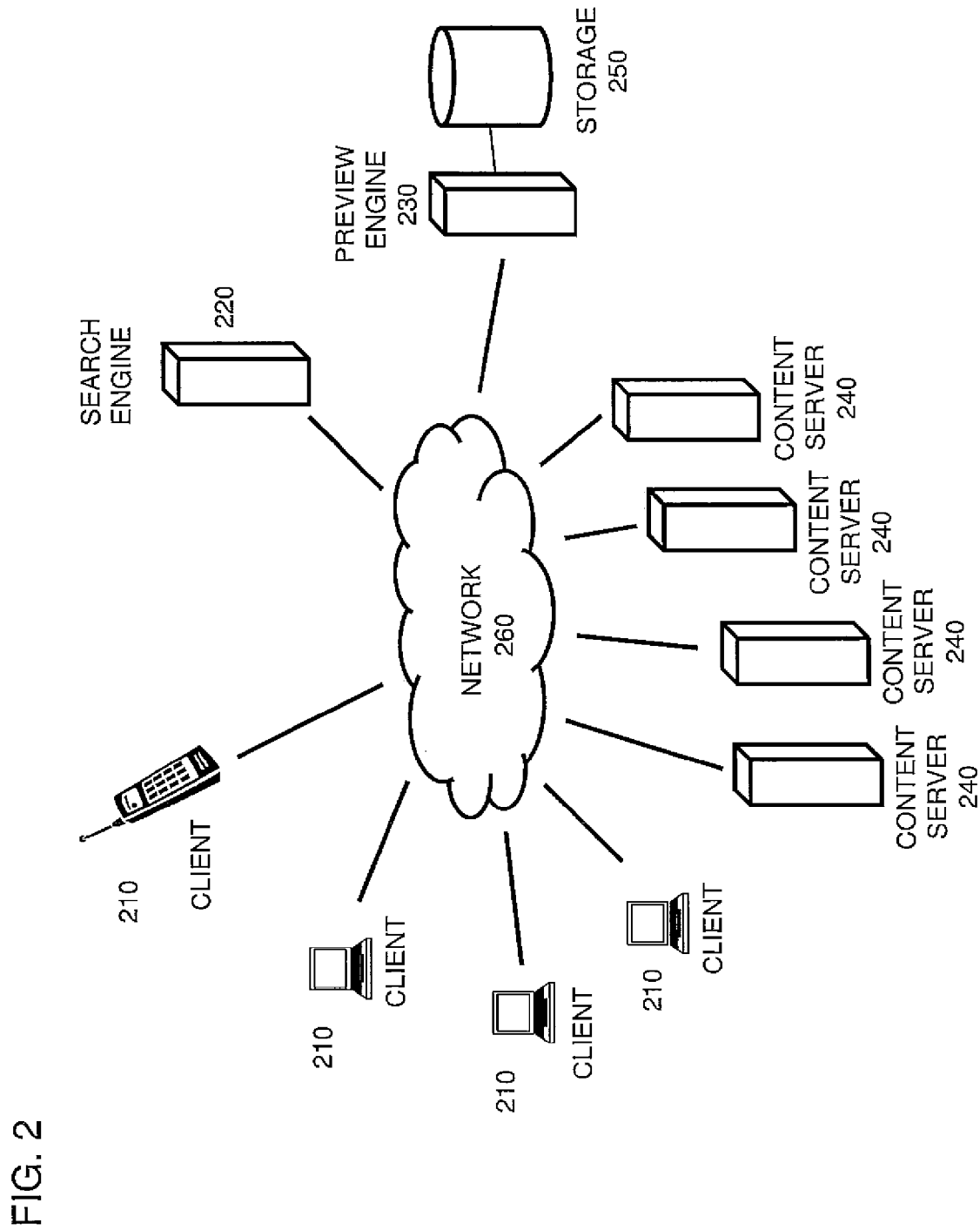
FIG. 2 is an exemplary diagram of a network based search system in which systems and methods consistent with the principles of the invention may be implemented.
Figure 2:
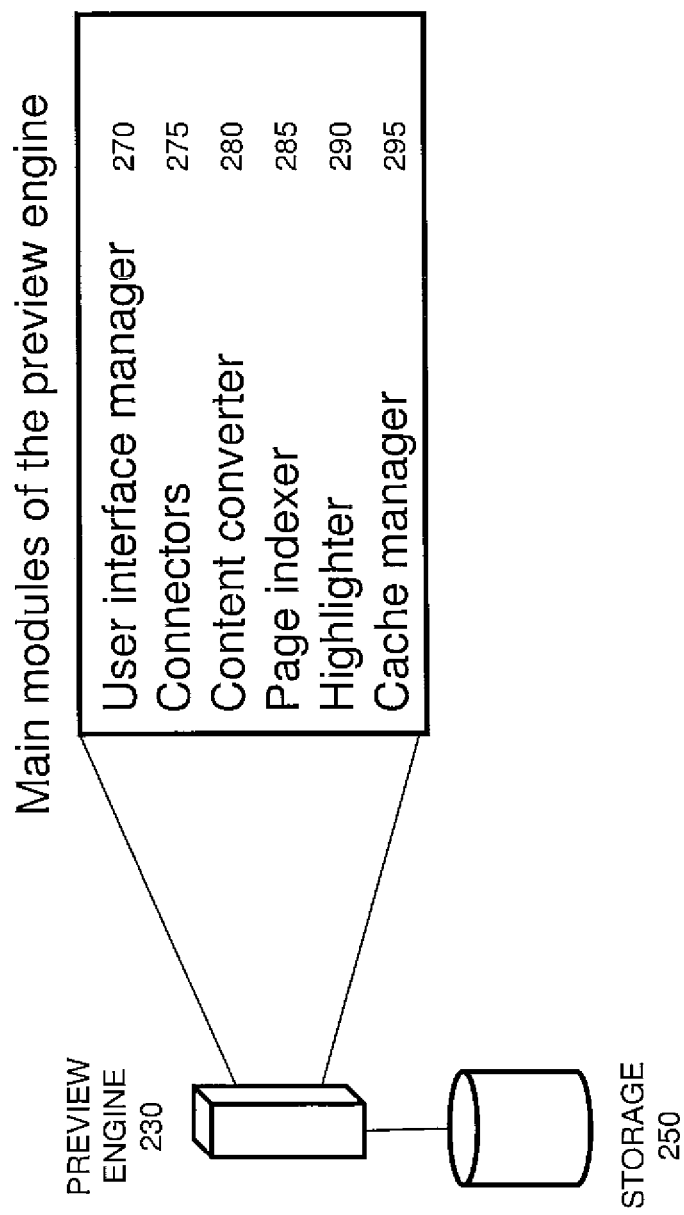

FIG. 2 is an exemplary diagram of a network in which arrangements and methods consistent with the principles of the invention may be implemented. The network may include multiple clients 210 connected to multiple servers 220-240 via a network 260. As an example, three clients 210 and six servers 220-240 have been illustrated as connected to the network 260. In practice, there may be more or fewer clients and servers.

The client may be defined as a device, such as a wireless telephone, a personal computer, a personal digital assistant (PDA), a laptop, or another type of computation or communication device or process running on one of these devices, and/or an object executable by one of these devices, or a process or a function running in an industrial process. Servers 220-240 may include server and storage entities that gather, process, search, and cache visual presentations of data file pages and preview folder structures with related meta-data in a manner that is consistent with the principles of the invention.

In an implementation consistent with the principles of the invention, server 220 represents a search engine usable by the clients 210 either directly, or via the server 230 that acts as a preview engine. Server 220 may find and identify data files and web documents located in the content servers 240, index the data files and web documents, and store information associated with the data files and web documents in a data repository. Server 220 may use other servers or alternative data repositories to store information associated to the data files or web documents that it may have crawled or analyzed from the content servers 240.

Server 230 runs the preview engine to generate and cache previews of the data file pages with associated meta-data into the content storage 250 according to the principles of the invention. The content storage 250 may be part of the preview engine 230 or it could be a separate server entity depending on the infrastructure requirements and deployment.

While servers 220-240 are shown as separate entities, it may be possible for one or more of servers 220-240 to perform one or more of the functions of another one or more of servers 220-240. It may be possible that several servers are clustered to run the search engine, and/or preview engine and/or content server as a single entity. It may also be possible that parts of the search engine, and/or preview engine and/or content server tasks are distributed to several servers. Search engine may be run as a separate service powered by dedicated server machine(s) as well or alternatively as an embedded service, included into some other application/service for providing application/service specific internal search functionalities.

Network 260 may include a local area network (LAN), a wireless local area network (WLAN) a wide area network (WAN), a wireless communication network, such as Global System for Mobile communications (GSM), an Intranet, the Internet, or a combination of networks. Clients 210 and servers 220-240 may connect to network 260 via wired, wireless, and/or optical connections.

FIG. 2A describes main modules of the preview engine 230. In an implementation consistent with methods and arrangements of the innovation the preview engine 230 may include at least the following modules: a user interface manager 270, connectors 275, a content converter 280, a page indexer 285, a highlighter 290 and a cache manager 295.

The interface manager 270 is equipped with means to interact with the user through the client 210, to interact with the search engine 220, to receive a search query, file preview request or file download request and to provide standalone data file preview pages or embed them into search results. The connectors 275 are a set of application program interfaces to connect the preview engine 230 to the other servers 220 and 240. The connectors 275 have means for sending a user search query to the search engine 220 or sending a user file downloading request directly to content server 240, receiving preview request from the search engine 220 or from the client 210, receiving a search result list from the search engine 220, and downloading the data files from the content servers 240 to the preview engine 230.

The content converter 280 has means for paginating data file content and rendering previews pages from the data files. The page indexer 285 has means for indexing the data file preview pages for filtering purposes, and means for searching and selecting the matching preview pages generated from the data files. The highlighter module 290 is arranged to highlight the search query text in the preview pages. The cache manager 295 has means for storing and retrieving data file preview pages into the storage 250 and for crawling the data file preview pages in the storage 250 according to the specified rules.

Figure 3:
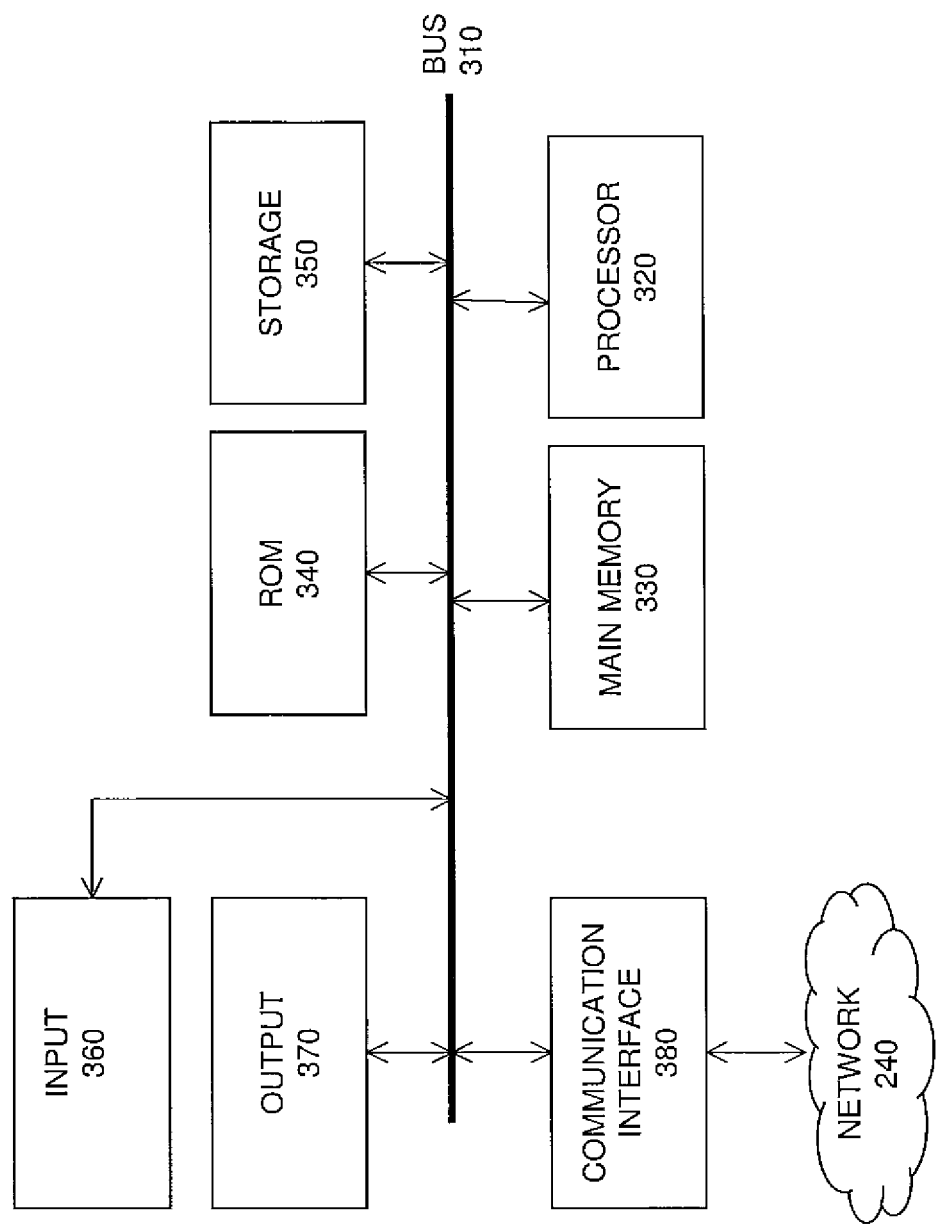
FIG. 3 is an exemplary diagram of a client or server of FIG. 2 according to an implementation consistent with the principles of the invention.

FIG. 3 is an exemplary diagram of a client or server entity (hereinafter called "the client/server entity"), which may correspond to one or more of clients 210 and servers 220-240, according to an implementation consistent with the principles of the invention. The client/server entity may include a bus 310, a processor 320, a main memory 330, a read only memory (ROM) 340, storage medium 350, input means 360, output means 370, and a communication interface 380 to the network 260. The bus 310 may include means or methods that permit communication among the elements of the client/server entity.

The processor 320 may include a conventional processor, microprocessor, or processing logic that interprets and executes instructions. The main memory 330 may include a random access memory (RAM) or another type of dynamic storage device that may store information and instructions for execution by the processor 320. The ROM 340 may include a conventional ROM device or another type of a static storage device that may store static information and instructions for use by the processor 320. The storage medium 350 may be a magnetic, electronic or optical medium, including needed drivers and devices.

The input means 360 may include a conventional mechanism that permits a user to input information to the client/server entity, such as a keyboard, a mouse, a pen, a touch screen, voice recognition and/or biometric mechanisms, etc.

The output device 370 may include a conventional mechanism that outputs information to the user, including a display, a printer, a speaker, etc. The communication interface 380 enables the client/server entity to communicate with other devices and/or systems over the network 260. For example, the communication interface 380 may include mechanisms for communicating with another device or system via a network 260.

As it will be described in detail below, the client/server entity described in FIG. 2, consistent with the principles of the invention, has equipped with means to perform certain search-related operations. The client/server entity may perform these operations in response to the processor 320 executing software instructions contained in the computer-readable medium, such as memory 330. A computer-readable medium may be defined as a physical or logical memory device.

The software instructions may be read into the memory 330 from another computer-readable medium, such as a data storage device 350, or from another device via the communication interface 380. The software instructions contained in the memory 330 may cause the processor 320 to perform processes that will be described later. Alternatively, a hardwired circuitry may be used in place of or in combination with software instructions to implement processes consistent with the principles of the invention. Thus, implementations consistent with the principles of the invention are not limited to any specific combination of hardware circuitry and software.

Figure 4:
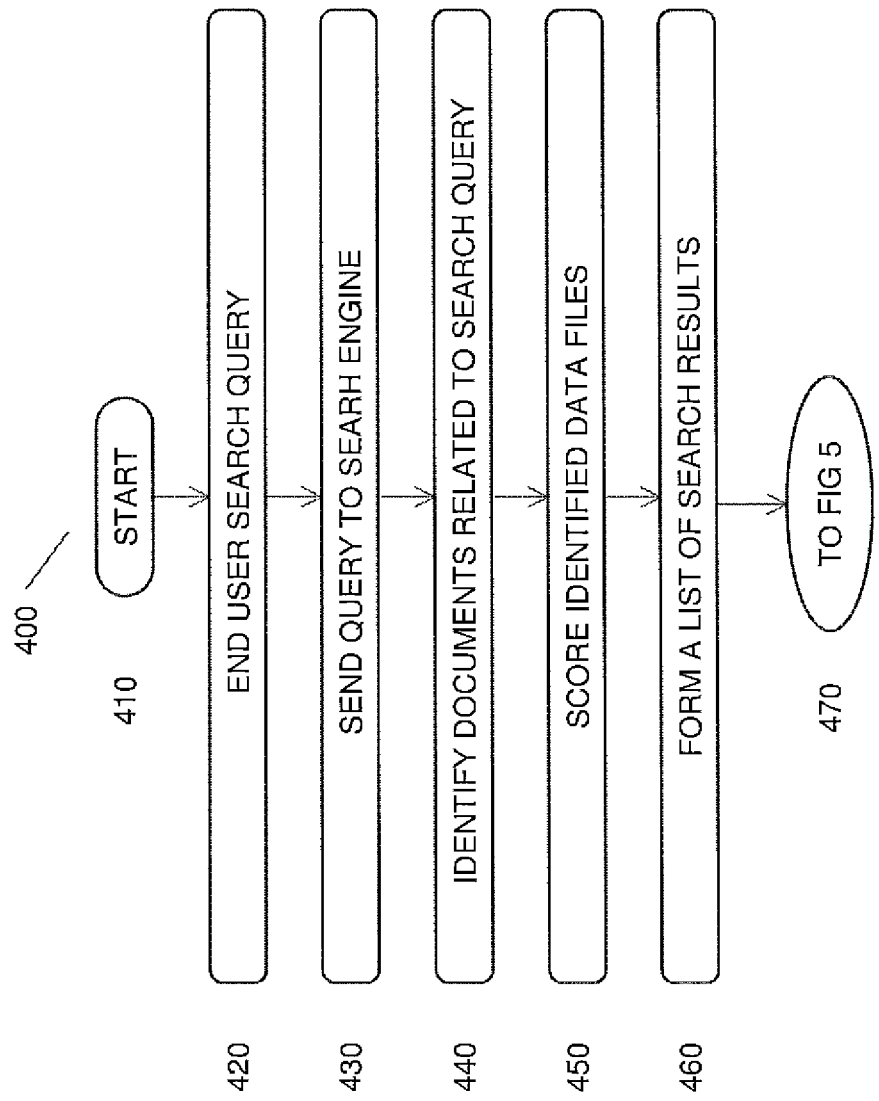
FIG. 4 is a flowchart of exemplary search query and search result from search engine according to an implementation consistent with the principles of the invention.

FIG. 4 describes an exemplary procedure 400 of a search query 420 related to the data files preview according to an implementation consistent with the principles of the invention. The procedure may begin with a user providing 410 a search keyword(s) and other criteria as a search query 420. The preview engine 230 receives the search query 430 and sends the search query 430 over the network 260 to the search engine 220. The search engine 220 may be a publicly available service such as Google or Yahoo Search or alternatively the search engine 220 may be located inside company network accessing internal data repositories or the search engine 220 could be embedded functionality of an application.

In one embodiment, the search query 420 is received by the search engine 220 from the preview engine 230. The search engine 220 is used to identify files (e.g. white papers, presentations, research papers, etc.) related to the search query 420. A number of techniques exist for identifying data files related to a search query 440. The techniques are known to those skilled in the art.

The data files identified by the search engine 220 are scored in some known manner in the step 450 of the procedure 400. The score for a data file may be based on an information retrieval (IR) score or a similar relevancy ranking value. Several techniques exist for generating an IR score. For example, one simple method for an IR score for a data file may be generated based on the number of occurrences of the search terms inside data files. Other techniques are known to those skilled in the art.

A list of search results 460 is formed by the search engine 220 based on the identified data files 440 and their scoring 450. In one implementation, the search results list 460 may include information associated with the data files, such as URL of the data file and the data file type and textual abstract of the data file. The search results list 460 may be provided as an HTML document, similar to the search results provided by the conventional search engines 220. Alternatively, the search results list 460 may be provided according to another format agreed upon by the search engine 220 and the preview engine 230, e.g. Extensible Markup Language (XML).

The list of search results 460 formed by the search engine 220 will be provided to the preview engine 230 for further processing 470. Once the preview engine receives the list of search results, it can fetch the original content, process it and provide page previews with keyword(s) highlighting.

Figure 5:
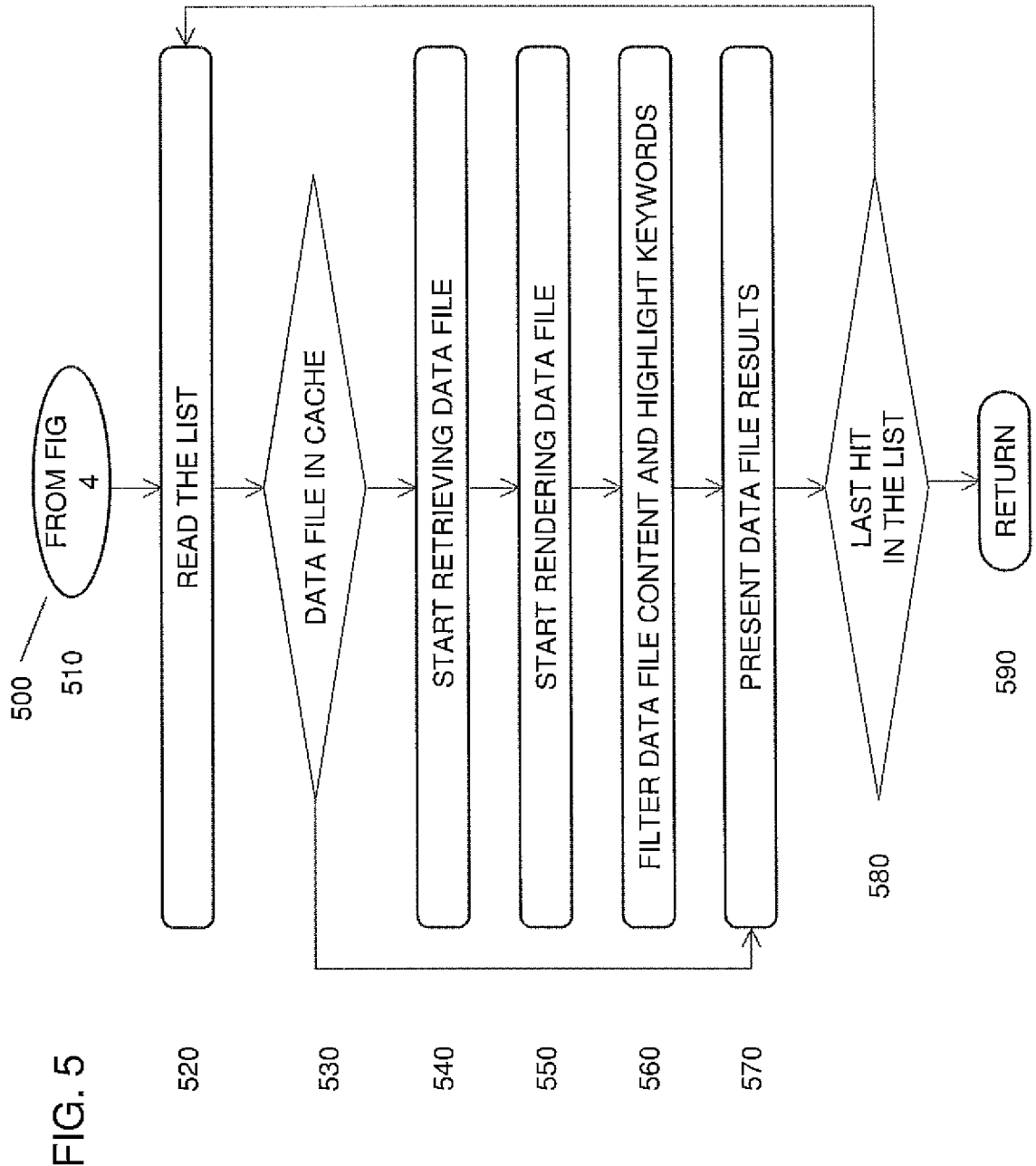
FIG. 5 is a flowchart of exemplary search result preview according to an implementation consistent with the principles of the invention.

FIG. 5 describes an exemplary procedure 500 of the data file preview creation with keyword(s) highlighting. The preview engine 230 has means for running the procedure 500 on the preview engine 230. The list of search results 460 that may be listed according to the scoring 450 is received from the search engine 220 to the preview engine 230. The search result may include search hits range from 1 to as many as the search engine 220 finds from the index. For the sake of preparing convenient output for the end user the entire search result list 460 is divided in K pages containing N hits according to resource constraints. The number of N may be 10 in one embodiment. The preview engine 230 receives the pointer to the search result list 460 in the step 510 of the procedure 500. The following step 520 in the procedure 500 running in the preview engine 230 reads the first hit from the search result list 460 and looks up if the corresponding data file previews already exists in the storage 250, and if it does, the procedure 500 is fitted to proceed directly to the step 560 for presenting data file results. In another arrangement step 520 could be replaced by user requesting directly to download a data file from the content servers 240. In case the data file is not cached in the storage 250 the preview engine 230 downloads the data file from the content server 240 according to the URL associated to the data file. When the preview engine 230 downloads the data file, it stores the data file into cache 530. When the preview engine 230 has retrieved the data file the content converter module 280 paginates and renders the data file preview pages 550. The content converter 280 calculates the visual layout and renders formatted content of the data file as accurately as possible according to the original appearance of the data file. In one embodiment the original appearance means the visual layout the data file may have when it is opened with a standard web browser.

According to the principles of this invention, the content converter 280 has means to artificially paginate the data file into multiple parts. It reproduces continuously-flowing non-paginated data file by accurately rendering its visual layout, and applies artificial pagination rules to divide these visual rendering results into multiple parts suitable for page-level previewing purposes. It creates one or more versions of the preview pages from the data file. In one embodiment, one version may be a set of small size preview pages and other version a set of larger, more readable preview pages. Yet in another embodiment, the size and visual dimensions of different versions of the preview pages can be fixed sizes specified by the user, the output display device or the system, or can be based on the size of the window used to view the data file preview pages.

In one embodiment, the content converter 280 has means to separate text and graphical information from the data file pages. The text information may be stored as an HTML content file including formatted text with position data and the graphical information may be stored as a background image file. In one embodiment there may be several background image files and one HTML text content file for a data file page. A preview page may be a combination of a layered HTML text and background image. One result of the data file rendering 550 may be several print sizes of the preview presentations from the data file pages.

Yet in another embodiment, the content converter 280 has means to convert the generated data file preview pages into vector formats such as but not limited to PDF or SVG. The result of the data file rendering 550 may be vector files of preview pages.

The original downloaded data file and the preview page files may be cached and stored into the storage 250 by the cache manager 295 once the data file rendering is completed for further usage to reduce the preview processing time in case the same data file is requested by another search query.

In one embodiment, the data file filtering stage 560 is executed by the page indexer module 285 that has means for indexing, searching and selecting those HTML text files and associated image files that match the search query keyword(s) or search phrase provided by the user. In one embodiment the page indexer 285 generates an index of the data file preview pages. This index is used for searching and selecting the matching preview pages of a certain data file. The index of data file preview pages may also be cached into the storage 250 for further retrieval and usage.

The present data file results phase 570 in procedure 500 uses the user interface manager 270 that has displaying means for displaying those data file preview pages which contain user search query keyword(s) or phrase to the end user. One data file may contain several keyword hits, which may be located in one or many different artificially generated preview pages of the data file. In one embodiment, the matching pages may be grouped together based on a relevancy order or some alternative criteria, and displayed as page level search results. In such an embodiment this procedure may be repeated since N data file hits provided by the search engine 220 will be processed by the user interface manager 270 for an output device in the client 210 to concurrently preview generated preview pages from multiple data files. The procedure 500 may be repeated on a user request to display search results on any page between 1 and K. The user may also provide a new search keyword(s) or phrase when the control is returned back to the procedure 400.

The step 580 identifies if the previously processed hit was the last one in the result list, and in case it was not, the procedure 500 jumps into the step 520 to read the next hit from the result list. In case the previously processed hit was the last one, the procedure 500 ends in step 590, and returns back to the procedure which originally called it within the preview engine 230.

Figure 5A:
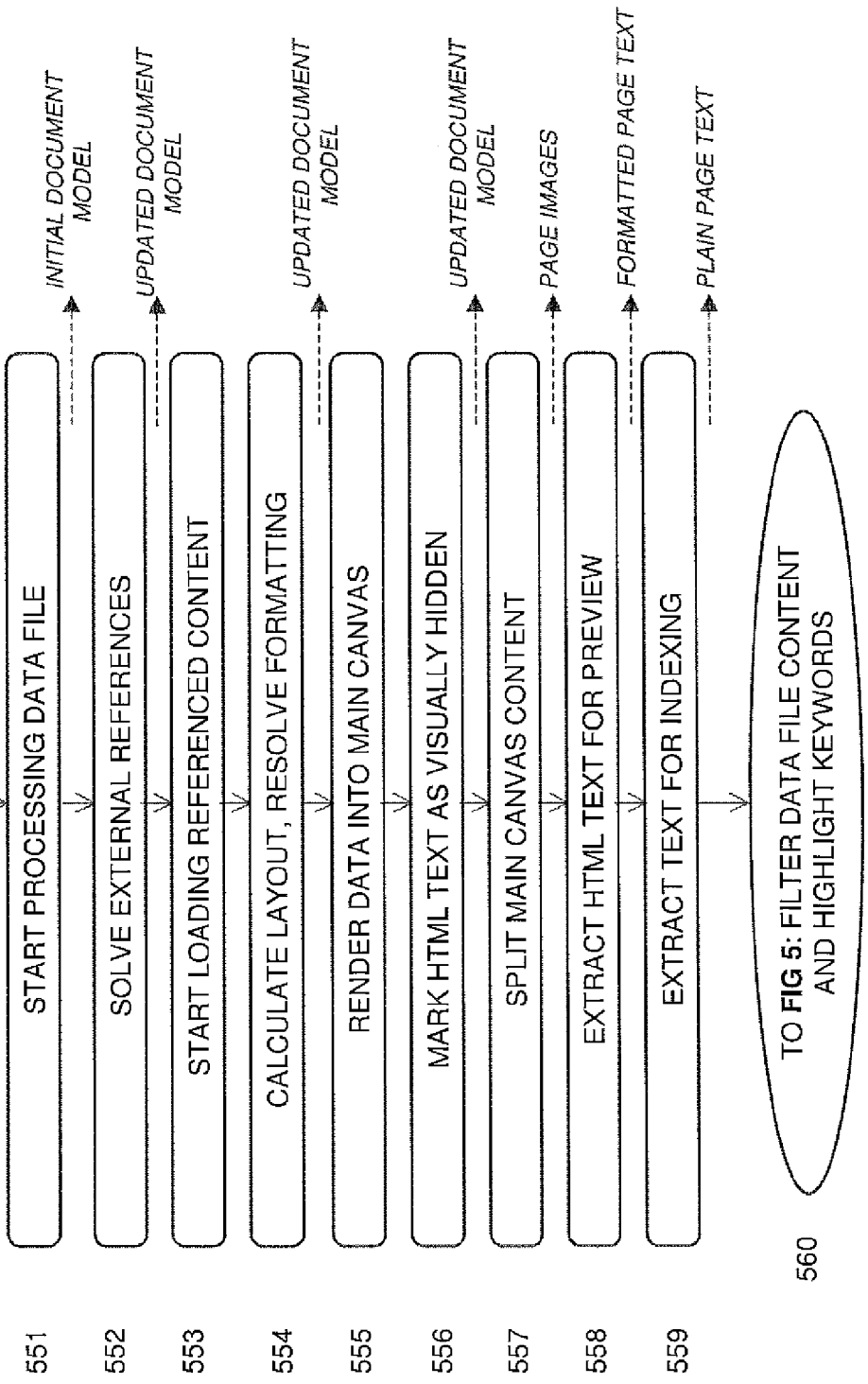
FIG. 5A is a flowchart of exemplary data rendering and preview page generation process according to an implementation consistent with the principles of the invention.

Flowchart in FIG. 5A shows an exemplary rendering process 550, which produces preview pages of the data file for later content filtering and keyword highlighting phase 560. In one embodiment, the data file is static data defined with an extensible HyperText Markup Language (XHTML) or HyperText Markup Language (HTML) content. In another embodiment, the data file may be a stream of data, generated dynamically by the content server 240, but yet again formatted as XHTML/HTML. In such a case of data streaming the dynamic creation of data content is started by the content server 240 when the preview engine 230 starts retrieving it in the step 540.

In one embodiment the system may start to process data file in the step 551 and to solve external references in the step 552 to other downloadable resources of the data file prior the initial data file download is complete. In another embodiment both processing 551 and solving external references 552 have to wait until the initial download is complete. After solving external references in the step 552 the system can start downloading other referred content resources in the step 553 and as this content gets downloaded, dynamically update applicable document object model after calculating layout and resolving content formatting in the step 554. The system has initialized a document specific structural hierarchical model once it started processing the data file in the step 551. In one embodiment, this structural hierarchical model can be a Document Object Model (DOM) while other similar technologies may be applied in other embodiments.

Once the system has completely retrieved the data file and other downloadable content resources referred in that data file, it renders the data represented in the document object model into the main drawing canvas in the step 555. In other embodiment, this optional content rendering phase 555 does not take place until the system has marked XHTML/HTML text as visually hidden in the step 556. It is also possible that the content rendering is carried out multiple times during the process, whenever the document object model is updated. By marking XHTML/HTML text as visually hidden 556 the system modifies the document object model, and as a result the content rendered into the main drawing canvas in the step 555 does not contain text objects the original data file had visible.

However, these hidden text objects still reserve the same space from the layout, effectively resulting the main drawing canvas to contain all other data objects but text from the data file. This maintains visual integrity of the data file content layout even when the embedded text objects are not visible. This process of visually hiding embedded text objects allows the system to present a new separate text layer on top of rendered main drawing canvas content. This text layer contains the same visible textual content as the original data file, but this time the text size changes can be applied for preview page zoom, as well as efficient text string highlighting applied on the generated text layer only.

As the original data file does not contain any pagination information, the system artificially paginates the content by applying its internal configurable pagination rules when it splits the main canvas content in the step 557 into preview page images. In this context the pagination should be understood as a way to define which part of the content gets rendered in a certain preview page. Typically such pagination is defined by the content paper size and embedded page breaks which the rendering system applies to the content. In case of artificial pagination, these defining factors are missing and the system must rely on other methods when deciding which part of the content belongs to a certain preview page.

The rules controlling artificial pagination may be based on system's internal factors such as system settings, user settings or system specific rules for content pagination. In one embodiment, system specific rules for content pagination relies also on analyzing external, content specific factors such as content length, content type and content source. In such an embodiment the system may, for example, define that a rendered page may contain at maximum 40 lines of text, and in case an artificially calculated page break would slice an image into two subsequent pages, maintain the image in one page by forcing it to be placed on the second page where it fits in completely.

In another embodiment the system may paginate the content differently, depending on the content file type and other content characteristics. For example, the system may seek to improve preview page readability by increasing the preview page size when it contains a lot of text instead of high-level images and graphs. This may result preview pages of a certain content to be different size than preview pages generated for some other piece of content. In such an embodiment the system may analyze the data file content, measure the ratio of text per page and by applying internal pagination rules, render preview pages with a size and content ratio tailored for that specific content situation.

The sizes and dimensions of these preview page images may vary, and the system can simultaneously produce one or many different preview page image versions of the same data file content. In one embodiment, these preview page images are stored as bitmap images like JPG, PNG and GIF. In other embodiment they are stored as vector format files like SVG and PDF.

In one embodiment the system has marked XHTML/HTML text as visually hidden in the step 556 and therefore the system must extract and create in the step 558 preview page specific files containing HTML text with style and position information. By layering this HTML text content on top of the preview page images without text, the system is able to reproduce visually accurate preview pages of the data file and include keyword highlighting in the step 560 inside visually accurate previews. In another embodiment the system may have produced preview page images containing the text, and in such a case this HTML text can be used when highlighting matching keywords in the step 560.

After the system has extracted HTML text in the step 558, it needs to process the data file content divided in preview pages for information search purposes. By extracting text for indexing in the step 559, the system enables the preview engine 230 to create preview page specific index entries into a data file specific search index, and thus enable the preview engine 230 to select those preview pages which contain matching keyword(s). After the text has been extracted in the step 559, the rendering process 550 is complete, and the preview content is ready for further processing by filtering content and highlighting keywords in the step 560.

FIG. 5B is an exemplary diagram describing how the data file content gets visualized in the main drawing canvas. When the system starts processing the data file in the step 551, it initializes the main drawing canvas. The final size of the drawing canvas is unknown at this stage, as the data file content, operating environment preferences and other system settings may have an impact on its size later in the process.

After the whole data file, and content resources it referenced to, have been retrieved, the system can calculate layout and resolve data content formatting in the step 554. This calculation and resolving modifies the document object model accordingly, and if these contents are rendered at the end of the calculation and resolving phase 554, the content rendered into the main drawing canvas is a complete representation of the original data file. In one embodiment the rendering of the content takes place after the system has marked the XHTML/HTML text visually hidden in the step 556. In another embodiment, the rendering may take place either just after the calculation and resolving phase 554 is complete or after the XHTML/HTML text has been visually hidden in the step 556—or after both phases.

After the data file contents have been rendered into the main drawing canvas, with or without the XHTML/HTML text objects, the system applies its internal configurable pagination rules and splits the main canvas content in the step 557 into preview page images.

FIG. 5C is an exemplary diagram describing how the document object model gets created and modified after the data file processing starts in the step 551. The document object model is modified and updated as the system parses thru the original data file, and retrieves other referred content resources in the step 553. Each content resource may have an impact on the document object model, and after all the referred resources have been retrieved, the system can calculate a final document layout and resolve data formatting in the step 554.

At this stage, the document object model contains structural, hierarchical description of the data file content. By marking the XHTML/HTML text as visually hidden in the step 556, the system yet again modifies and updates the document object model. At this point the document object model can be used as a basis for rendering the original data file content while hiding included text objects. While text objects are visually hidden, they are still appropriately stored in the document object model and can be retrieved for other purposes. In one embodiment, the system now extracts the XHTML/HTML text for enabling a layered presentation of the preview page. It creates preview page specific XHTML/HTML files containing text objects with a style and position information.

After the system has extracted HTML text in the step 558, it processes the data file content divided in preview pages for information search purposes. By extracting text for indexing in the step 559, the system enables the page indexer module 285 in the preview engine 230 to create preview page specific index entries into a data file specific search index.

Figure 6A:
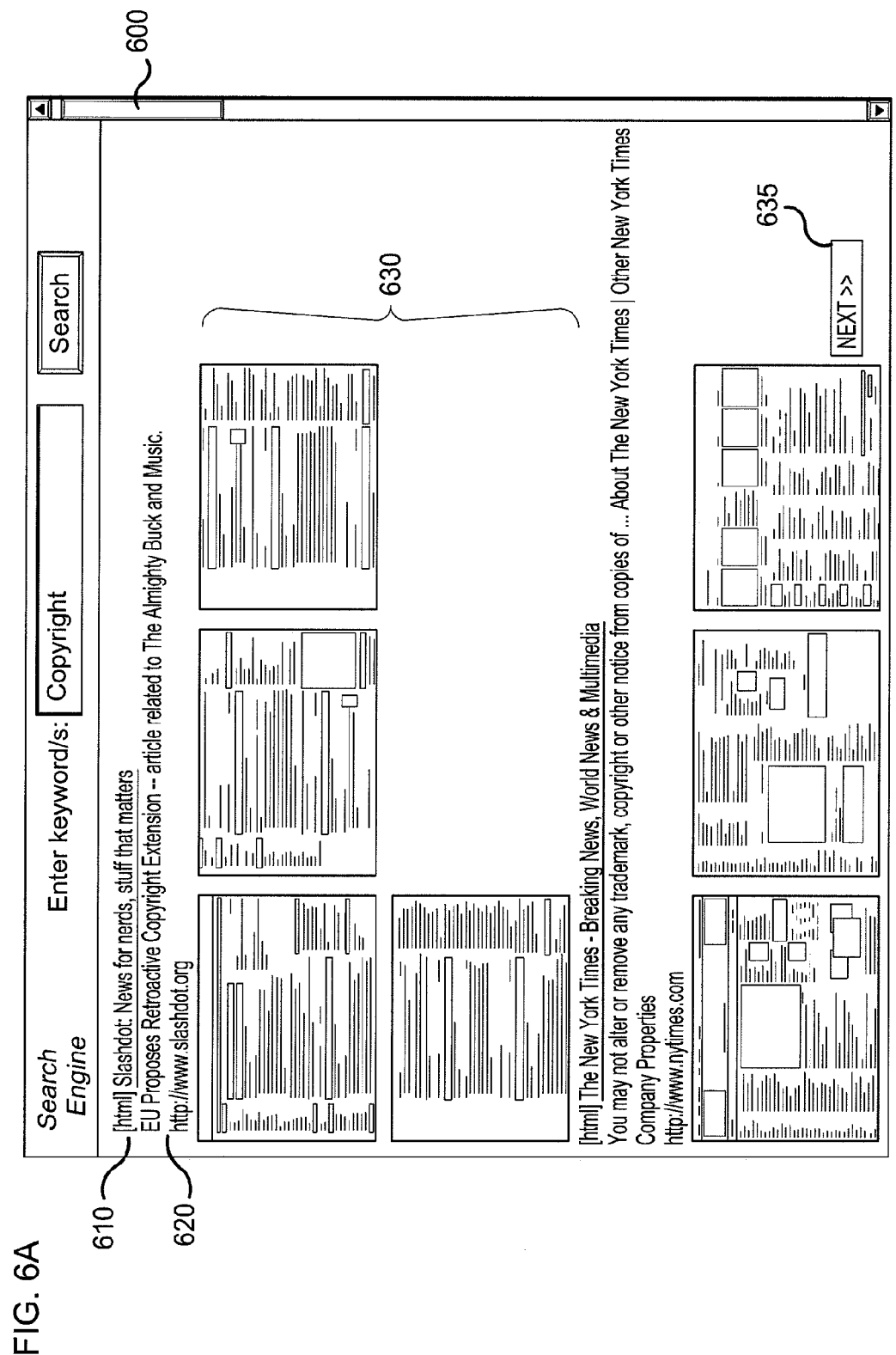
FIGS. 6A-6C are exemplary diagrams of user interface for presenting concurrent preview pages of data files as a part of search results according to implementations consistent with the principles of the invention.
Figure 6B:
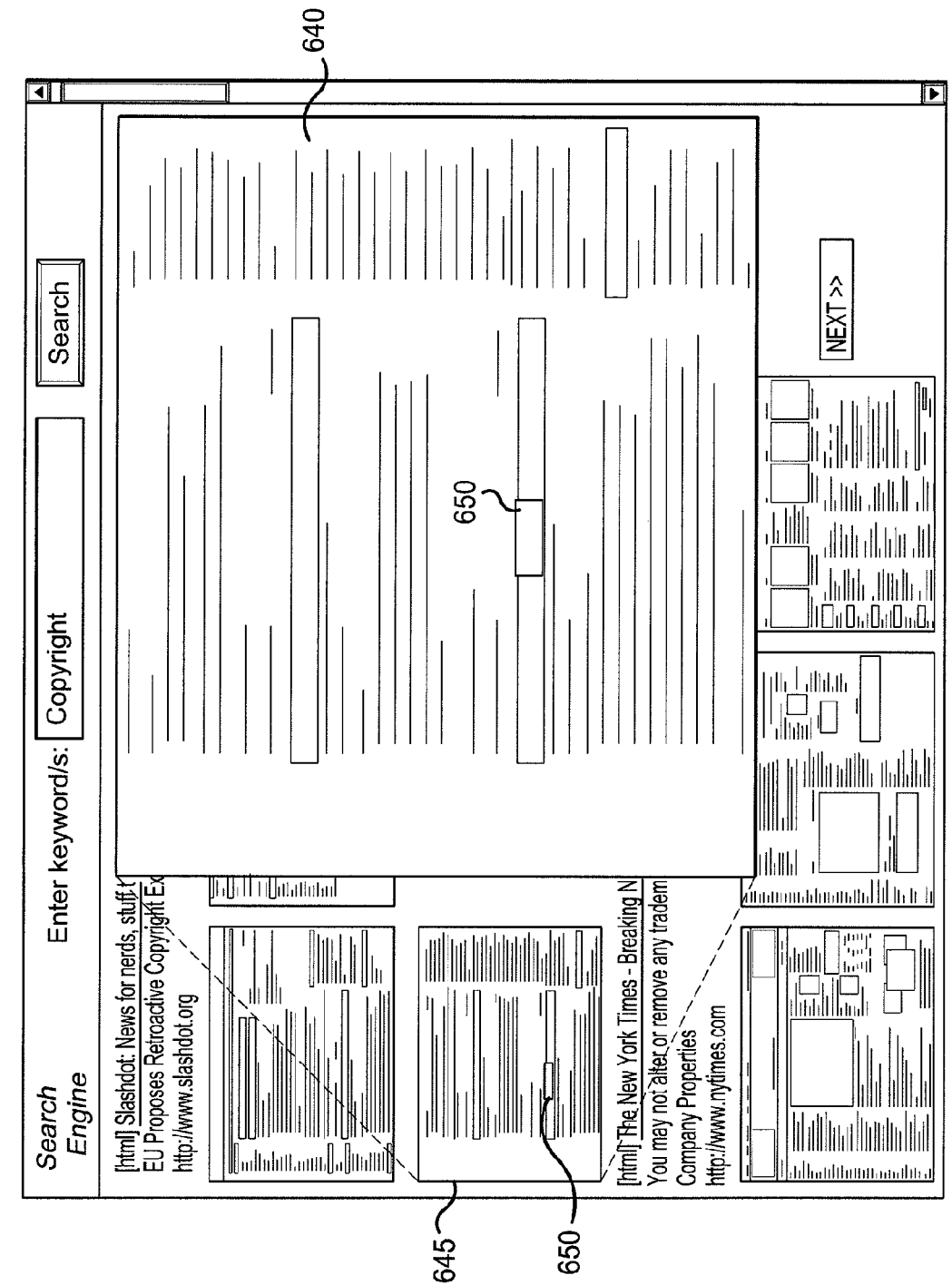
Figure 6C:
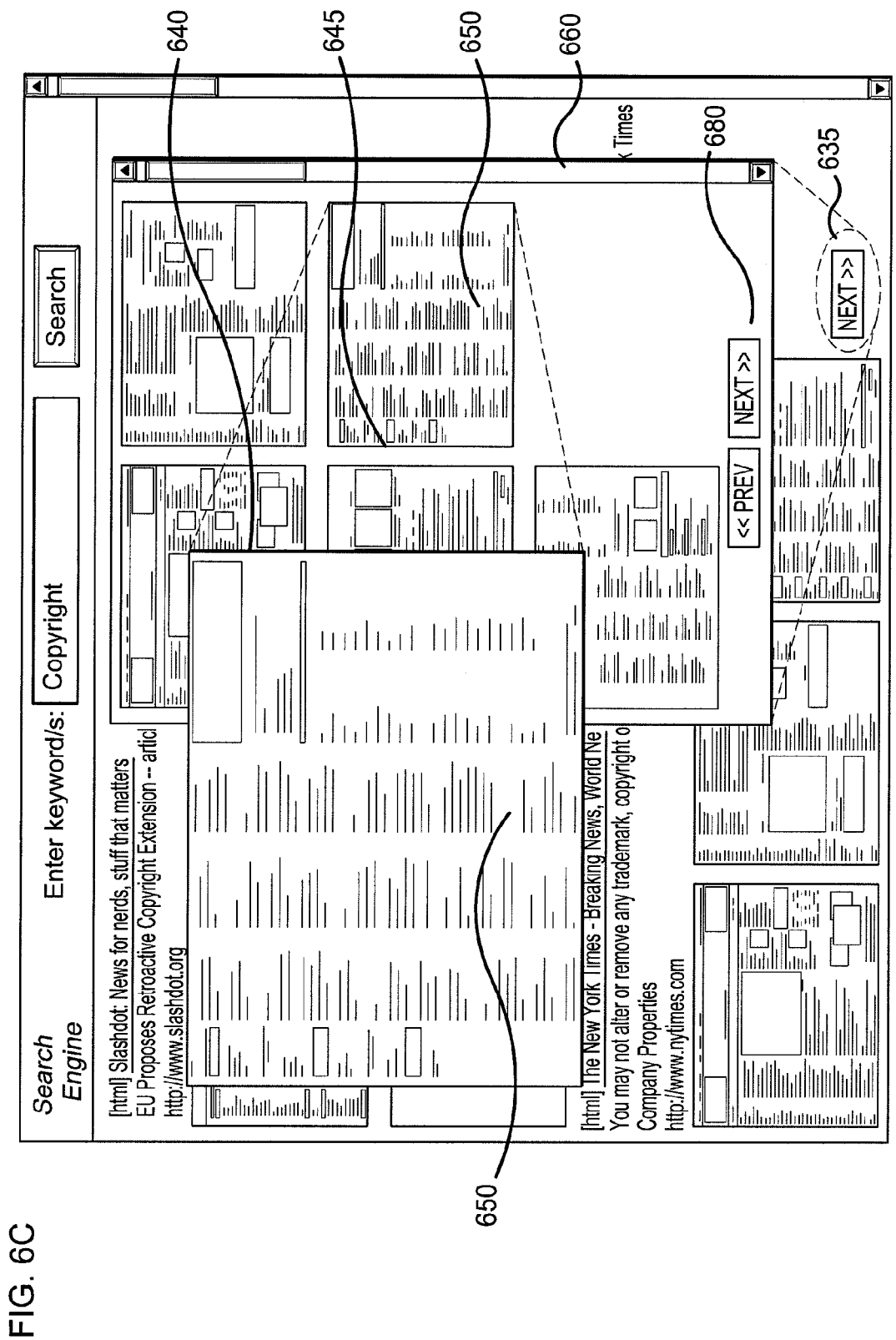

FIGS. 6A-6C are exemplary diagrams of data file preview page output implementations in a browser consistent with the principles of the invention. The user interface manager module 270 controls output for the user in the client 210. In one implementation, as shown in FIG. 6A a data file preview page output 600 may include the data file type and name as a hyperlink to download the data file 610 and a textual abstract of the data and its URL 620. This data file information may be provided by the search engine 220 or other system, as a part of the search result data. The data file preview may include a set of preview pages associated with the data file search results 630. The data file preview pages that match to the user search query are laid out in a preview section in the m by n matrix 630.

The matrix 630 and the size of the preview pages may be a fixed size specified by the user or the system, or can be based on the size of the window used to view the data file preview pages. In one embodiment the m by n may be 3 by 2. Yet in another embodiment, the preview pages may contain highlighting of the keyword(s) or phrase(s) used by the user in the search query. In case the data file contains more than preset m by n page hits, (e.g. the system or the user has defined the present matrix size to six but there are fifteen preview pages available), for the user search query there may be a link 635 for other set of preview pages.

In another implementation of the data file preview page viewing, as shown in FIG. 6B, a preview page may include a link to a larger preview page 640 of the small preview page. The selected small preview page 645 that is zoomed in for better readability may have matching search keyword(s) highlighted. The bigger preview page 640 may be opened when the cursor or client pointer moves on the top of the small size preview page 645 or the small size preview page 645 is clicked with the client pointer or cursor action. The large preview page 640 may be closed by a pointer click or moving the client pointer outside the large preview page area. In one embodiment, both the small and the large preview pages may have similar text highlighting method 650 of the search key word(s) or phrase.

In yet another implementation, as shown in FIG. 6C, the data file may contain more than preset m by n page hits. The small preview page matrix section 630 of data file may include a link 635. By clicking the link 635 with the client pointer or cursor action a new output screen 660 opens with a matrix of i by j small preview pages. The size of i by j matrix may be a fixed specified by the user or the system according to system resource constraints. In one embodiment, the window may have navigation links 680 to the previous or next set of small preview pages 660 according to data file keyword hit locations.

In one implementation there may be means for navigating in the search results listing 460. There may be links to the previous or next set of the small preview pages 600, there may also be a numeric link or other links to directly jump into another set of the small preview pages 600 inside the search result listing 460.

CONCLUSION

The invention must be understood as a tool and method to improve the user's ability to discover and preview information from large amount of stored data. The methods and arrangements consistent with the principles of the invention will improve information discovery and previewing efficiency with the instant access to the data files using generated preview pages. The invention may be used in the context of existing or new network based data search solutions and services, as well as to discover local data repositories with and within a single or clustered computer system.

The foregoing description of the preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 4-6, the order of the acts may be modified in other implementations consistent with the principles of the invention. Further, non-dependent acts may be performed in parallel.

It has been described that data files in the search result list are received from the search engine. In other implementations, however, the data files may be identified in other ways, such as from a directory, category, data repository or another listing of data files. Yet in another implementation the search may be done to local data file repositories located in the client device.

The procedure 500 describes how content converter 285 creates preview pages from data files. The starting point for creating preview pages is the search result list 460. However in another implementation preview pages may be converted from a direct user request asking to download a data file from the content server 240 initiating the procedure 500 running in the preview engine 230.

In one implementation the client 210, the search engine 220, the preview engine 230 and the content server 240 may be a single entity accessing local data files in the client 210 using a bus 310 and other possible distributed data files using the network 260. This arrangement is commonly known as a local search.

Also, exemplary graphical user interfaces have been described with respect to FIGS. 6A, 6B and 6C. In other implementations consistent with the principles of the invention, the graphical user interfaces may include more, fewer, or different pieces of information, arranged in a different order and visual orientation than what has been defined as the exemplary implementation. For instance the m by n matrix mentioned earlier can be smaller or bigger that mentioned 3 by 2 matrix. The characters m and n can be for example any integer numbers between 1 and 20.

It will be apparent to one of ordinary skill in the art that aspects of the invention, as described above, may be implemented in many different forms of software, firmware, and hardware in the implementations illustrated in the accompanying drawings. Thus, the operation and behavior of the aspects were described without reference to the specific software code—it being understood that one of ordinary skilled in the art would be able to design software and control hardware to implement the aspects based on the description herein.

What is claimed is:

1. A method for paginating and previewing content within one or more data files received in response to an information search, the content within the one or more data files being in an essentially continuously-flowing non-paginated format, wherein information content within the one or more data files include content formatted by markup language code, the method comprising:
   entering a search query;
   sending the query to a search engine, and receiving a search result having a list of data files each of which comprises content represented in a markup language code matching the search query; and
   for each of the data files in the list:
      retrieving the data file;
      paginating the content of the retrieved data file into discrete pages by applying pagination rules for dividing the content of the retrieved data file into multiple parts each suitable for page-level previewing purposes;
      generating preview pages each for rendering the same visible content of the retrieved data file that has been paginated into a respective discrete page of the retrieved data file;
      sending the preview pages to a client device which constructs a data file preview for the data file that simultaneously displays a subset of the preview pages generated for the data file, each of which is automatically selected for display in the data file preview by virtue of containing content that matches the search query,
   wherein the constructed data file preview is configured to allow an end user of the client device to select preview pages, which are displayed in the data file preview, in order to view higher resolution versions of those preview pages matching the corresponding discrete pages of the retrieved data file.

2. The method of claim 1, wherein the data file content is paginated into the discrete pages based on system rules, user configuration and operating environment preferences.

3. The method of claim 1, wherein the preview pages are indexed for the content filtering, and wherein the selected preview pages are selected according to the results of the content filtering.

4. The method of claim 1, wherein
   the preview pages are rendered to HTML and image files, or vector files, and
   the data file preview is compiled from a layered presentation of HTML content and image content associated to the corresponding area of the original data file, or from a vector file.

5. The method of claim 1, wherein at least one or more image files are created from each of the preview pages.

6. The method of claim 1, wherein
   keyword(s) or phrases of the search query are highlighted page previews that are automatically selected for display in the data file preview.

7. The method of claim 1, wherein the search result area is reserved to display the preview pages generated from the data file.

8. The method of claim 1, wherein the selected preview pages are displayed in an m by n matrix format in the data file preview, and a user selectable zoom-in to the preview pages is provided within the matrix format.

9. The method of claim 1, wherein the selected preview pages are displayed in the data file preview in connection with the data file information provided by the search engine.

10. The method of claim 1, wherein the preview pages are populated essentially immediately in an m by n matrix in the data file preview when preview data becomes partially available.

11. The method of claim 1, wherein preview pages that are not currently displayed in the data file preview are pre-loaded in the memory of the preview engine for later viewing.

12. The method of claim 1, wherein one or multiple preview pages of each data file containing matching keyword(s) is shown to the user.

13. A system for paginating and previewing content within one or more data files received in response to an information search, the content within the one or more data files being in an essentially continuously-flowing non-paginated format, wherein information content within the one or more data files include content formatted by markup language code, the system comprising:
one or more clients with a processor, a user interface, and a communication interface to a network that facilitates a connection between the clients and a search engine; and
a preview engine that performs the following:
receives a search result from the search engine in response to a query sent to the search engine, the sear result having a list of data files each of which comprises content represented in markup language code matching the search query, and
for each of the data files in the list:
retrieves the data file;
paginates the content of the data file into discrete pages by applying pagination rules for dividing the content of the retrieved data file into multiple parts each suitable for page-level previewing purposes;
generates preview pages each for rendering the same visible content of the retrieved data file that has been paginated into a respective discrete page of the retrieved data file;
sending the preview pages to a corresponding client device which constructs a data file preview for the data file that simultaneously displays a subset of the preview pages generated for the data file,
wherein, for each of the data files, the preview engine automatically selects from the preview pages generated for the data file the preview pages to be displayed in the constructed data file preview by virtue of the selected preview pages containing content matches that matches the search query, and
wherein the constructed data file preview is configured to allow an end user of the client device to select preview pages, which are displayed in the data file preview, in order to view higher resolution versions of those preview pages matching the corresponding discrete pages of the retrieved data file.

14. The system of claim 13, wherein the preview engine has at least a user interface manager, connectors, a content converter, a page indexer, and a cache manager.

15. The system of claim 14, wherein the content converter is configured to paginate the content of each of the data files in the list to generate the preview pages.

16. The system of claim 14, wherein
the connectors are equipped to connect the preview engine to the search engine and to content servers, and
the connectors are configured to:
send a user search query to the search engine,
receive search result lists from the search engine, and
download the data files from the content servers to the preview engine.

17. The system of claim 13, wherein at least one of the data files is a static file stored at a content server.

18. The system of claim 13, wherein at least one of the data files is a dynamic stream of data, which is generated by a content server when requested.

19. The system of claim 14, wherein
the cache manager is configured to store and retrieve folder data and the preview pages with associated meta-data into a storage, and
the page indexer is configured to index the preview pages for filtering purposes, and search and select the matching preview pages for display in the data file preview.

20. The system of claim 13, wherein
the user interface of the corresponding client has at least a search result list area for displaying a list of search results containing at least one or more data file hits provided by the search engine, and
the system is configured to reserve a search result area to display the selected preview pages in the data file preview in an m by n matrix format.

21. The system of claim 13, wherein
the preview pages are displayed in the data file preview in connection with the data file information provided by the search engine, and
the data file preview has a display area to present preview pages in m by n matrix.

22. The system of claim 13, wherein the user interface of the corresponding client comprises a button, link or area adapted to be clicked by a user for additional preview pages.

23. The system of claim 13, wherein
an output screen created by the preview engine comprises navigation buttons, links or areas adapted for a user to navigate backward and forward through preview pages stored in the memory, and
the preview engine provides one or more buttons adapted to be used to navigate between the search result list provided by the preview engine.

24. The system of claim 13, wherein the selected preview pages are displayed in the data file preview in a matrix in a new output screen, and are user selectable for zoom-in pages.

* * * * *